United States Patent Office 3,509,242
Patented Apr. 28, 1970

3,509,242
TRI(ALKYL THIOPHENYL)PHOSPHITES
Harry Braus, Springdale, and Jay R. Woltermann, Cincinnati, Ohio, assignors to National Distillers and Chemical Corporation, New York, N.Y., a corporation of Virginia
No Drawing. Filed Dec. 20, 1967, Ser. No. 691,973
Int. Cl. C07f 9/12; C08f 45/58
U.S. Cl. 260—949
2 Claims

ABSTRACT OF THE DISCLOSURE

Alkyl thiophenyl phosphites are provided which have the formula:

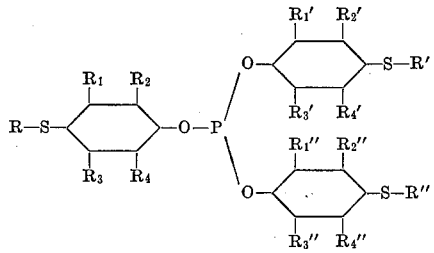

in which the R, R', and R'' radicals are alkyl having from one to about twenty-two carbon atoms and the other R's are selected from the group consisting of hydrogen and alkyl having from about one to about twelve carbon atoms, the total number of carbon atoms of the other R's in any phenyl ring not exceeding fifteen.

In addition, stabilizer combinations useful in enhancing resistance of olefin polymers to deterioration in physical properties due to heat are provided consisting essentially of the alkyl thiophenyl phosphite, in combination with carbon black and/or a hindered phenol.

Olefin polymer compositions are also provided having an enhanced resistance to heat deterioration, due to the presence therein of an alkyl thiophenyl phosphite, alone or in combination with carbon black and/or a hindered phenol.

---

This invention relates to alkyl thiophenyl phosphites and to compositions useful in the enhancement of the resistance of olefin polymers, such as ethylene polymers, to deterioration in physical properties due to heat, comprising an alkyl thiophenyl phosphite, alone or in combination with carbon black and/or a hindered phenol, and to olefin polymer compositions having an enhanced resistance to heat deterioration, due to incorporation therein of such compounds, and to a process of enhancing the resistance of olefin polymers to heat deterioration, employing such compounds.

Many of the most important applications of polyethylene such as its use in cable sheathings depend upon its superior physical properties, as evaluated by low temperature brittleness, tensile strength and abrasion resistance tests coupled with good water repellency. Other uses take advantage of its high dielectric strength in applications such as primary insulation of wire conductors.

Unfortunately, however, polymeric materials such as polyethylene are subject to deterioration in air and weather from sunlight, i.e., ultraviolet radiation, and heat, both of which induce oxidation of the polyethylene and thereby lead to increased brittleness at low temperatures and reduced tensile strength and dielectric properties.

In addition, when polyethylene is mechanically worked in the presence or absence of air at the elevated temperatures necessary for processing, molecular structural changes occur wherein the polymer deteriorates in tensile elongation, and the original electrical resistivity of the polymer at high and low frequencies diminishes progressively. At the same time undesirable changes occur in both the viscous and elastic components of melt flow behavior. Cross-linking occurs upon prolonged exposure of the polymer to ultraviolet radiation in the presence of air.

It is customary to incorporate small amounts of carbon black into polyethylene to shield it from the deleterious degradative effects of ultraviolet radiation, and thereby enhance its resistance to light deterioration. Many compounds, so-called thermal stabilizers or antioxidants, are incorporated as well, to enhance the resistance of polyethylene to thermal and oxidative degradation, such as various amines, diaryl mono-sulfides, phenolic compounds, organic phosphites, and the like.

In view of the fact that carbon black when incorporated into essentially saturated hydrocarbon polymers also acts as a mild thermal stabilizer, it might be expected that the incorporation of stabilizers into polymeric materials containing carbon blacks would result in increased stability against thermally induced deterioration. It was discovered many years ago, however, that not only is the effect of such stabilizers and carbon black in the polymer not necessarily additive, but that the effectiveness of many stabilizers in the presence of carbon black can be and frequently is reduced severalfold. In many instances the stabilizer is rendered completely ineffective so that the polymer has no more resistance against thermal or oxidative degradation than does a sample containing no stabilizer whatsoever. The diminished activity or complete ineffectiveness of many thermal antioxidants such as diphenyl-p-phenylenediamine or the hindered phenol, 2,2'-methylenebis-(4-methyl-6-t-butyl-phenol), when in combination with carbon black is reported in the Journal of Applied Polymer Science, 1, 37–42, 43–59 (1959).

A class of alkyl thiophenyl phosphites has been discovered which, even when combined with carbon black, are capable of enhancing resistance to deterioration of polyolefin compositions, such as polyethylene, in physical properties due to exposure to heat, despite the presence of carbon black.

In accordance with the instant invention, a stabilizer system for polyolefins is provided consisting essentially of an alkyl thiophenyl phosphite, alone or in combination with carbon black and/or a hindered phenol, to improve resistance of the polyolefins to heat-induced deterioration, for long periods of time. Such a combination displays a surprising stabilizing action against heat-induced deterioration, particularly in view of the presence of the carbon black and/or phenol, suggesting that each component of the combination synergizes the stabilizing action of the other. This is especially surprising in view of the fact that in combination with carbon black the effectiveness of most commercially available antioxidants is decreased.

The special properties of the alkyl thiophenyl phosphite-carbon black combination are enhanced when it is combined with a hindered phenol. The Journal of Applied Polymer Science article cited hereinbefore described the deleterious effects that carbon black has on the hindered phenol 2,2' - methylenebis-(4-methyl-6-t-butyl - phenol), which alone (without carbon black) gives good protection to polyethylene against heat-induced deterioration but which with carbon black is practically ineffective. In the presence of the alkyl thiophenyl phosphite, however, the combination of the carbon black with the hindered phenol not only does not destroy the effectiveness of the phenol but synergizes the effectiveness thereof, so that the three component combination is more effective than any of the components or pairs of components thereof, taken separately. This is a surprising result, that could not have been predicted even from the effectiveness of the combination of carbon black and alkyl thiophenyl phosphite.

Thus, also in accordance with the instant invention, a preferred composition of the invention is provided, consisting essentially of a combination of an alkyl thiophenyl phosphite, carbon black, and a hindered phenol, which combination is more effective than any of the components or pairs of components thereof in enhancing the resistance of olefin polymers, such as ethylene polymers, to deterioration is physical properties upon exposure to heat.

In addition, in accordance with the instant invention, olefin polymer compositions are provided, such as ethylene polymer compositions, consisting essentially of the olefin polymer in combination with an alkyl thiophenyl phosphite, alone, or with carbon black and/or hindered phenol, and preferably consisting essentially of the olefin polymer in combination with the alkyl thiophenyl phosphite, carbon black and a hindered phenol.

Further, in accordance with the instant invention a process for enhancing the resistance of olefin polymers, such as ethylene polymers, to deterioration in physical properties upon exposure to heat is provided, which comprises incorporating in the olefin polymer an alkyl thiophenyl phosphite, alone or with carbon black and/or a hindered phenol, and preferably a combination of alkyl thiophenyl phosphite, carbon black and a hindered phenol.

The alkyl thiophenyl phosphites in accordance with the invention can be defined by the formula:

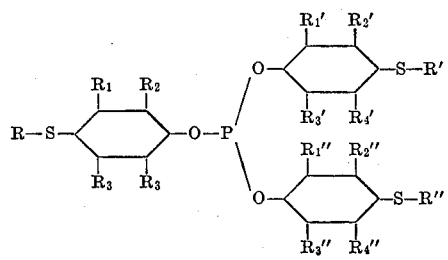

in which the R, R' and R'' radicals are alkyl having from one to about twenty-two carbon atoms and $R_1$, $R_2$, $R_3$, $R_4$, $R_1'$, $R_2'$, $R_3'$, $R_4'$, $R_1''$, $R_2''$, $R_3''$, and $R_4''$ are hydrogen or alkyl having from one to twelve carbon atoms, and the total number of carbon atoms in the $R_1$, $R_2$, $R_3$, and $R_4$ groups in any phenyl ring does not exceed fifteen.

As typical R radicals there can be mentioned methyl, ethyl, propyl, isopropyl, butyl, sec-butyl, tert-butyl, isoamyl, hexyl, octyl, isooctyl, 2-ethyl hexyl, nonyl, tetradecyl, octadecyl, lauryl, decyl, palmityl, and stearyl.

Examples of alkyl thiophenyl phosphite suitable for use herein include, but are not limited to, tri(4-methylthiophenyl) phosphite,
tri(4-methyl-thio-3-methylphenyl) phosphite,
tri(4-ethyl-thiophenyl) phosphite,
tri(4-ethyl-hexylthiophenyl) phosphite,
mono-(4-butylthio-phenyl) di(4-methyl-thiophenyl) phosphite,
tri(4-lauryl-thiophenyl) phosphite,
tri(4-isoamyl-thio-2,3,5,6-tetramethyl-phenyl) phosphite,
tri(4-isooctyl-thiophenyl) phosphite,
tri(4-nonylthio-3,5-dimethyl-phenyl) phosphite,
tri(4-decyl-thiophenyl) phosphite,
tri(4-methyl-thio-2,6-diethyl-phenyl) phosphite,
tri(4-methylthio-2,6-diethyl-phenyl) phosphite,
tri(4-palmitylthio-phenyl) phosphite,
tri(4-ethyl-thio-3,5-dimethylphenyl) phosphite, and
tri(4-methyl-thio-3,5-di-tert-butyl-phenyl) phosphite.

The alkyl thiophenyl phosphites can be prepared by known procedures, which form no part of the instant invention. Thus for example, they can be readily prepared by reaction of the appropriate 4-alkyl-thiophenol with phosphorus trichloride in the presence of an acid acceptor, such as a tertiary amine, to form the corresponding alkyl thiophenyl phosphite.

This is a known reaction, and forms no part of the instant invention. Using a mixture of 4-alkyl-thiophenols, the reaction product can be composed of a mixture of 4-alkyl-thiophenyl phosphites, which can also be employed in the instant invention.

Carbon black suitable for use herein includes both activated or unactivated types, such as channel carbon black, furance carbon black, animal or vegetable carbon black, thermal carbon black, light lamp blacks, acetylene blacks and the like, and carbon blacks activated in the presence of such materials as oxygen, sulfur or selenium. The average particle size of carbon black used herein should be below about 1000 Angstroms, and preferably below about 200 Angstroms, so as to ensure the obtention of a uniform dispersion of the carbon black through the polymer.

The phenols which can be used herein should be hindered, i.e., substituted in both positions ortho to the hydroxyl group, and can contain from about eight to about 300 carbon atoms. Such phenols can be monocyclic or polycyclic, and monohydric or polyhydric.

The hindered monocyclic phenols which can be employed have the structure:

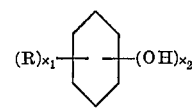

R is selected from the group consisting of halogen; and organic radicals containing from one to about thirty carbon atoms, such as alkyl, aryl, alkenyl, alkaryl, aralkyl, cycloalkenyl, cycloalkyl, alkoxy, aryloxy and acyl

where R' is aryl, alkyl, or cycloalkyl.

$x_1$ is an interger from two to four, and $x_2$ is an integer from one to four, and the sum of $x_1$ and $x_2$ does not exceed six.

The monocyclic phenol containing one or more hydroxyl groups should be substituted in both positions ortho to each hydroxyl group.

Polycyclic phenols include aromatic nuclei which are linked by a bivalent linking radical, and are defined by the formula:

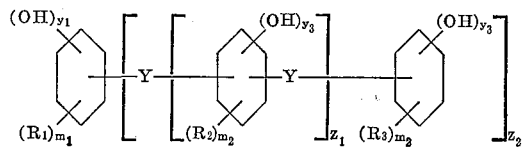

wherein $R_1$, $R_2$, and $R_3$ are inert substituent groups of the type of R above, Y is a bivalent linking radical, and is selected from the group consisting of oxygen atoms or an alkylene or alicyclene or arylene or a mixed alkylene-alicyclene or mixed alkylene-arylene groups, having a straight or branched chain, whose total number of carbon atoms ranges from one to about eighteen, $m_1$ is an integer from one to a maximum of $5-(z_2+y_1)$; $m_2$ can be an integer from zero to three; and $m_3$ an integer from one to four. $z_1$ can be an integer from zero to about six and $z_2$ an integer from one to five, preferably one or two. Preferably, the hydroxyl groups in polycyclic phenols are located ortho and/or para to Y. There can be from one to four hydroxyl groups per phenyl nucleus, $y_1$, $y_2$ and $y_3$ representing the numbers thereof, each phenyl nucleous being substituted in both positions ortho to each hydroxyl group. Preferably, there will be only one hydroxyl group per phenyl nucleus.

Y can be a single bond, as in diphenyl, or a bivalent group, such as:

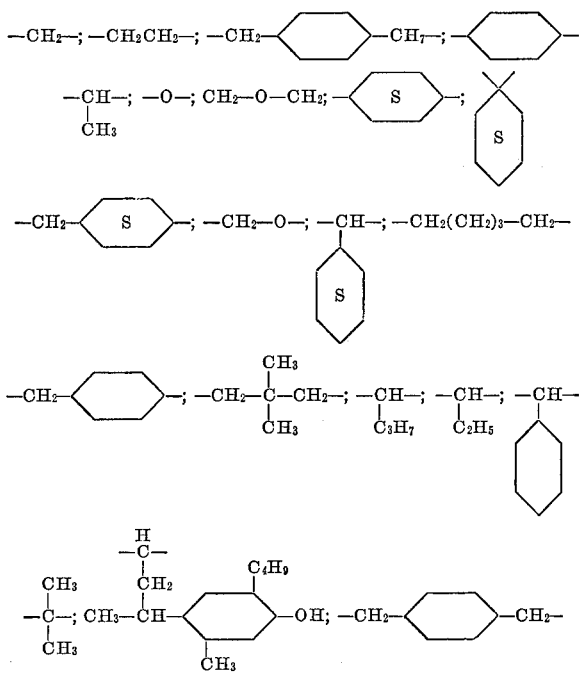

Representative phenols include 2,6 - di - tert - butyl - 4-methyl phenol, 2-tert-butyl-6-methoxy phenol, 2,6-dinonyl phenol, 2,3,4,6-tetradecyl phenol, 2-isopropyl-6-dodecyl phenol, 2-methyl-6-octyl phenol, 2-hexyl-6-n-decyloxy phenol, 2-nonyl-3-methyl-6-decyloxy phenol, and 2-nonyl-6-benzyl-oxyphenol, 2,6-di-tert-butyl-2- methoxy-p-cresol (Antioxidant 762) and 3,5-di-tert-butyl-4-hydroxybenzyl ether.

Exemplary polyhydric monocyclic phenols are: 2-ethyl-4-octyl-6-methyl resorcinol, 2-dodecyl-4-methyl-6-nonyl - resorcinol, 2 - methyl - 4 - isooctyl - 6 - dodecyl - phloroglucinol, 2,4,6-tri-tert-butyl-resorcinol, and 2,4,6-triisopropyl-phloroglucinol.

Exemplary polyhydric polycyclic phenols are 2,2'-methylene - bis (6 - tert - butyl - phenol), 2,2' - methylene-bis (4 - methyl - 6 - tert - butyl - phenol) (Cyanamid 2246), 4,4' - methylene - bis (2,6 - di - tert - butyl - phenol) (Ethyl Antioxidant 712 or Ionox 220), 2,2'-methylene-bis (4-ethyl-6-tert-butyl-phenol) (Cyanamid 162), 4,4'-methylene-bis (6-tert butyl-o-cresol) (Ethyl Antioxidant 220), 4,4'-oxobis (2-methyl-6-isopropyl phenol), 2,2'-oxobis (6-dodecyl phenol), 4,4'-n-butylidene-bis (2-tert-butyl-6-methylphenol), 4,4'-benzylidenebis (2-tert-butyl-6-methylphenol), 4,4'-cyclohexylidenebis (2,6-di-tert-butyl phenol), 1,3,5-tri methyl-2,4,6-tris (3,5-di-tert-butyl-4-hydroxy-benzyl-benzene) (Ionox 330), 2,2'-methylene - bis (4 - methyl - 6 - (1' - methyl - cyclohexyl) - phenol), 2,6-bis (2'-hydroxy-3'-tert-butyl-5'-methylbenzyl)-4-methylphenol, 1,1,3-tris (2-methyl-4'-hydroxy-5'-tert-butylphenyl) butane and $\alpha^2, \alpha^6$ bis (3-tert-butyl-5-methyl-2-hydroxy-phenyl)-mesitol.

The preferred stabilizer system of the invention comprises two or three stabilizers, the alkyl thiophenyl phosphite and carbon black and/or a hindered phenol. These two and three stabilizers together can display a stabilizing effectiveness which is not depressed by the carbon black or hindered phenol, and which can exceed that obtainable from any of them alone, or in combinations of two. On the other hand, however, when the hindered phenol alone is employed with carbon black, the hindered phenol loses almost all of its antioxidant effectiveness, and accordingly the synergistic result using the three component combination is especially unexpected. This enhanced stabilizing effect is obtained with any olefin polymer, regardless of the process by which it is prepared.

A sufficient amount of the stabilizer combination of the invention is used to enhance the resistance of the olefin polymer against deterioration in physical properties, including, for example, resistance to embrittlement upon exposure to heat under the conditions to which the polymer will be subjected. Small amounts are usually adequate. Amounts of the alkyl thiophenyl phosphite within the range from about 0.002 to about 0.5% by weight of the olefin polymer and amounts of carbon black within the range from about 0.2 to about 5% by weight of the olefin polymer are satisfactory. For many polyethylene applications, carbon black concentrations of up to about 50% can be present, especially where partially conductive polyolefin-carbon black compounds are employed. Preferably, from about 0.05 to about 0.15% of the alkyl thiophenyl phosphite and from about 2 to about 3% of the carbon black are employed for optimum enhancement of resistance to heat deterioration.

The hindered phenol can be used in quantities as low as about 0.002%, and as high as about 0.5% by weight of the olefin polymer, and preferably in amounts from about 0.02 to about 0.1% by weight of the olefin polymer.

The two component combinations of stabilizers of the invention will generally contain from about 0.05 to about 0.15% of the alkyl thiophenyl phosphite, and from about 0.3 to about 3.0% of the carbon black, or from about 0.02 to about 0.1% of the hindered phenol, by weight of the combination. The three component combinations include all three in the same relative amounts.

Other thermal stabilizers can be employed in the compositions of the present invention such as organic hydrocarbon phosphites, thiodipropionic acid esters, polyvalent metal salts or organic acids, organic polysulfides, aminophenols, and the like. Light stabilizers can be employed in the composition of the instant invention such as various 2-hydroxy-benzophenones, thiosalicylates and the like.

Conventional additives such as fillers, pigments, and plasticizers can also be present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is applicable to olefin polymers prepared by any of the various procedures, using the available catalysts (Chem. & Eng. News, Nov. 21, 1960, pp. 56–59), inasmuch as the molecular weight and tacticity are not factors affecting this stabilizer.

Formerly, olefin polymers prepared by these processes contained traces of catalyst residues. These residues materially diminished the stability of the olefin polymer, despite efforts to overcome the problems by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective with olefin polymers substantially free from catalyst-containing polymers with good results.

The stabilizer of the invention is particularly applicable to ethylene homopolymers, which include normally solid low or high molecular weight homopolymers obtained from ethylene. Such polymers usually have a molecular weight of at least 6,000 and preferably a molecular weight of 20,000 to 45,000 or more. They have a waxy feel, and when examined by the X-ray diffraction technique exhibit the presence of a crystalline phase.

Mixtures of ethylene homopolymers with other compatible polymers, and copolymers of ethylene with copolymerizable monomers such as styrene, vinyl chloride, vinyl acetate, vinylidene chlorofluoride and methyl methacrylate which are not reactive with the stabilizer combination, the ethylene polymer or copolymer being present in a sufficient amount, usually a major amount, i.e. about 85% weight or more, to present the stabilization problem resolved by the invention, also can be stabilized. The term "ethylene polymer" as used herein includes, accordingly, homopolymers such as low or high density polyethylene, and Ziegler polyethylene and ethylene copolymers, and mixtures of ethylene homopolymers, as discussed above.

The stabilizers of the invention can also be used with other olefin polymers, such as polypropylene, poly(butene-1), poly(pentene-1), poly(3-methyl butene-1), poly-4-methyl-pentene-1, and polystyrene.

The term "olefin polymer" encompasses both homopolymers and copolymers, as well as mixtures of olefin polymers.

The stabilizer is incorporated in the polymer in suitable mixing equipment, such as a mill, a Banbury mixer, an extruder and the like. If the ethylene polymer has a melt viscosity which is too high for the desired use, the ethylene polymer can be worked until its melt viscosity has been reduced to the desired range, before addition of the stabilizer. The resulting mixture is then removed from the mixing equipment, and brought to the size and shape desired, for marketing or use.

The stabilized olefin polymer can be worked into the desired shape, such as by milling, calendering, extrusion, or injection molding or fiber-forming.

The term "consisting essentially of," as used herein, means that the ingredients recited in the specification and claims are the essential ingredients of the composition of the invention and no others are employed which would be undesirable in the enhancement of the resistance of olefin polymers to deterioration in physical properties due to exposure to heat.

The following example illustrates the preparation of the alkyl thiophenyl phosphites of the invention:

EXAMPLE A

Tri(4-methylthiophenyl) phospite

Reaction:

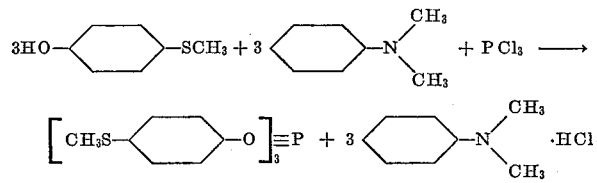

Procedure: Into a dry 1-liter, 3-neck flask equipped with a stirrer, thermometer and addition funnel, protected with drying tube, was placed (0.51 mole) 71.5 gms. of 4-(methylthio)-phenol, (0.51 mole) 61.8 gms. of N,N-dimethyl-aniline and 300 ml. of anhydrous diethyl ether. The solution was cooled with stirring to 5° C. and added dropwise a solution of (0.17 mole) 23.4 gms. of phosphorous trichloride in 75 ml. of anhydrous diethyl ether. The batch temperature was kept between 0–7° C. during the addition. The mixture was then stirred at room temperature for one hour, then filtered, and the ether remove under vacuum. There remained a clear, water-white liquid.

*Analysis.*—Calculated (percent): C, 56.2; H, 4.7; S, 21.4; P, 6.9. Found (percent): C, 56.0; H, 4.9; S, 21.6; P, 6.8.

EXAMPLES 1 AND 2

Two-and three-component stabilizer compositions tri-(alkylthiophenyl) phosphite-hindered phenol, and the same plus carbon black, were evaluated for their stabilizing effect, in enhancing the resistance of polyethylene to deterioration in physical properties due to exposure to heat. The stabilizers used were tri(4-dimethyl thiophenyl) phosphite with Ethyl 702, 4,4'-methylene-bis(2,6-ditertiary butyl phenol), and with channel carbon black having an average particle size of about 20 A. (Cabot Regal 330R). Stabilizers were weighed and dispersed in previously unstabilized polyethylene (NA280), melt index 0.15 (ASTM D1238–62T at 190° C.), using a two-pound laboratory Banbury mixer. The mixture was placed in a cold roll mill and was flattened and the crepe produced cut to convenient size for subsequent tests. Table I below sets forth the stabilizers contained in each of the various samples of polyethylene prepared. Although control A did not contain any stabilizers or carbon black, it was subjected to the same preparatory mixing as the other samples.

The effectiveness of the stabilizer systems of the invention in inhibiting heat deterioration was evaluated by DSC analysis (68C–725–175–1) as follows.

The Perkin-Elmer differential scanning calorimeter was employed. This apparatus is equipped with a recorder which records the heat or energy changes in the samples undergoing testing as a function of time (chart speed). When a noticeable break appears in the trace recorded, this indicates that the sample has undergone a change in condition. The samples tested were in the form of discs, prepared as follows. Film was pressed from the resin at a temperature of 125° C. and a pressure of 800 p.s.i. Discs having a diameter of about ¼ inch and a thickness ranging from about 2 to about 3 mils were cut from the film. The discs were introduced into the calorimeter cell, and heated from a temperature of 37° C. to a temperature of about 200° C. at a rate of 80° C./min. in an atmosphere of nitrogen. When the temperature reached 200° C., the nitrogen was replaced by oxygen flowing at a rate of 5 ml./min. and the recorder was at that time started. When a noticeable break appeared in the trace, the induction time was obtained from the chart speed which was set at 12 inches per hour. The reported DSC induction times are comparable when taken at the same size, shape, and thickness of the sample, cell geometry, and the rate of oxygen flow over the surface. The DSC of a standard sample was 13.2 min.

TABLE I

| Stabilizer | Controls | | | | | Examples | |
| --- | --- | --- | --- | --- | --- | --- | --- |
| | A | B | C | D | E | 1 | 2 |
| Tri(4-methyl thiophenyl) phosphite (p.p.m.) | | | | | 1,000 | 1,000 | 1,000 |
| 4,4'-methylene-bis (2,6-di-tert-butylphenol) (p.p.m.) | | | 500 | 500 | | 500 | 500 |
| Carbon black percent | | 2.6 | | 2.6 | | | 2.6 |
| Minutes to failure (DSC analysis) | 2 | 2 | 13 | 25 | 1 | 28 | 53 |

Controls A, C and E are to be compared to Example 1, and controls B, D, and E to Example 2. It is evident from Example 1 that the tri(4-methyl-thiophenyl) phosphite greatly enhanced the effectiveness of the phenol (cf. controls A, C, and E). The additive effect should have been 14(C+E), whereas 28 was noted.

Addition of carbon black greatly enhanced the synergism. The additive effect expected for Example 2 should have been 26(D+E), whereas 53 was noted.

The data clearly show that the two- and three-component stabilizer compositions of the instant invention enhanced the resistance of polyethylene against degradation due to exposure to heat.

EXAMPLES 3 TO 6

Two- and three-component stabilizer systems of the invention, namely, the tri(alkyl thiophenyl) phosphite and hindered phenol combination, with and without carbon black, were evaluated for stabilizing effectiveness in polyethylene NH326, using the Perkin-Elmer DSCDl test and the procedure described in Examples 1 and 2. The sample film was heated to a temperature of 200° C. under a nitrogen atmosphere. After the sample reached temperature equilibrium, oxygen was admitted to the sample cell at a flow rate of five ml. per minute. All samples were run in duplicate and the reproducibility required between duplicate samples was ten percent or better. The stabilizers used were tri(4-methyl thiophenyl) phosphite, Ethyl 702, the hindered phenol, 4,4′-methylene-bis(2,6-di-tert-butyl phenol), and carbon black.

The following data were obtained:

TABLE II

| Example No. | Composition | Induction time (min.) |
|---|---|---|
| 3 | 1,000 p.p.m. tri(4-methyl thiophenyl) phosphite. | 7.50 21.0 |
| 4 | 500 p.p.m. tri(4-methyl thiophenyl) phosphite, 500 p.p.m. 4,4′-methylene-bis(2,6-ditert-butyl phenol). | |
| 5 | 1,000 p.p.m. tri(4-methyl thiophenyl) phosphite, 2.6% carbon black. | 43.13 |
| 6 | 500 p.p.m. 4,4′-methylene-bis(2,6-ditert-butyl phenol), 500 p.p.m. tri(4-methyl thiophenyl) phosphite, 2.6% carbon black. | 68.63 |
| Control | None | 4.5 |

The data show the effectiveness of the tri(4-alkyl thiophenyl) phosphites of the invention, alone and in combinations with carbon black, with hindered phenol, and with both.

Having regard to the foregoing disclosure, the following is claimed as the inventive and patentable embodiments thereof:

1. Alkyl thiophenyl phosphites of the formula:

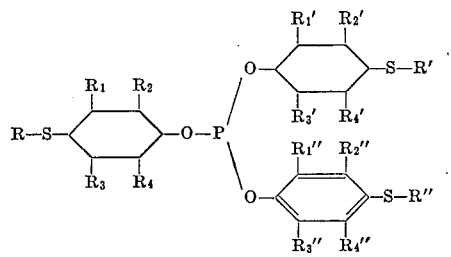

in which the R, R′, and R″ radicals are alkyl having from one to about twenty-two carbon atoms and the other R's are selected from the group consisting of hydrogen and alkyl having from about one to about twelve carbon atoms, the total number of carbon atoms of the other R's in any phenyl ring not exceeding fifteen.

2. Tri(4-methyl thiophenyl) phosphite.

References Cited

UNITED STATES PATENTS 2,293,445   8/1942   Nelson.

CHARLES B. PARKER, Primary Examiner

A. H. SUTTO, Assistant Examiner

U.S. Cl. X.R.

260—45.95, 590, 619, 612, 976, 624